US012663164B2

(12) United States Patent
Gattei et al.

(10) Patent No.: US 12,663,164 B2
(45) Date of Patent: Jun. 23, 2026

(54) COOKING OVEN

(71) Applicant: ELECTROLUX APPLIANCES AKTIEBOLAG, Stockholm (SE)

(72) Inventors: Lorenzo Gattei, Forli (IT); Massimo Banzato, Forli (IT); Marco Carnevali, Forli (IT); Caterina Utili, Forli (IT); Claudia Robbe, Pordenone (IT); Fabio Picardi, Pordenone (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 377 days.

(21) Appl. No.: 18/278,822

(22) PCT Filed: Feb. 2, 2022

(86) PCT No.: PCT/EP2022/052503
§ 371 (c)(1),
(2) Date: Aug. 24, 2023

(87) PCT Pub. No.: WO2022/179816
PCT Pub. Date: Sep. 1, 2022

(65) Prior Publication Data
US 2024/0200790 A1      Jun. 20, 2024

(30) Foreign Application Priority Data

Feb. 25, 2021     (EP) ..................................... 21159403

(51) Int. Cl.
*A47J 27/04*          (2006.01)
*F24C 15/32*         (2006.01)
*F24C 14/00*         (2006.01)
(52) U.S. Cl.
CPC ............. *F24C 15/327* (2013.01); *A47J 27/04* (2013.01); *A47J 2027/043* (2013.01); *F24C 14/005* (2013.01)

(58) Field of Classification Search
CPC ....... F24C 15/327; F24C 14/005; A47J 27/04; A47J 2027/043; F22B 1/28
(Continued)

(56) References Cited

U.S. PATENT DOCUMENTS

| | | | | |
|---|---|---|---|---|
| 6,987,246 | B2 * | 1/2006 | Hansen | ..................... A21B 3/04 |
| | | | | 219/401 |
| 7,045,745 | B2 * | 5/2006 | Kim | ....................... F24C 15/327 |
| | | | | 392/397 |
| 7,537,004 | B2 | 5/2009 | Reay | |

FOREIGN PATENT DOCUMENTS

| | | |
|---|---|---|
| CN | 201683698 | 12/2010 |
| CN | 208524530 | 2/2019 |

(Continued)

OTHER PUBLICATIONS

International Search Report and Written Opinion for PCT/EP2022/052503, dated Apr. 20, 2022, 11 pages.

*Primary Examiner* — Avinash A Savani
(74) *Attorney, Agent, or Firm* — Chrisman Gallo Tochtrop LLC

(57) ABSTRACT

A Cooking oven (100) comprising a) at least one cooking cavity (102) and b) at least one steam generation system (40) for introducing steam into the cooking cavity (102) during a steam operating mode, in particular steam cooking mode or steam cleaning mode, c) wherein the steam generation system (40) comprises c1) at least one steam generator (42), c2) at least one fluid supply (44), the fluid preferably being water with impurities, in particular calcium, and optionally additives and c3) at least one valve (2), d) wherein the valve (2) is interconnected between the fluid supply (44) and the steam generator (42) in order to control the flow of fluid from the fluid supply (44) to the steam generator (42) during the steam operating mode, e) wherein the valve (2) com-
(Continued)

prises at least one inlet (12) for the fluid being in fluid connection with the fluid supply (44) f) wherein the valve is in fluid connection with the steam generator (42) by means of at least one connecting line (50), g) wherein the valve (2) is provided with at least one closing device (19) for closing and opening the inlet (12) of the valve at least partially during the steam operating mode in order to keep the fluid level within the valve at an operating level within an operating level range during the steam operating mode, h) the cooking oven further comprising one or more of the following features: h1) the valve (2) and the steam generator (42) and the connecting line (50) are arranged in such a way that the level of the fluid within the steam generator (42) and within the valve (2) is kept the same during the steam operating mode and/or wherein the valve (2) and the steam generator (42) and the connecting line (50) are arranged according to the principle of communicating vessels, h2) the operating level (N) or the operating level range during the steam operating mode is, in the direction of gravity, higher than or at the same level as the inlet (12) of the valve (2).

16 Claims, 3 Drawing Sheets

(58) Field of Classification Search
USPC ........................................................ 126/369
See application file for complete search history.

(56) References Cited

FOREIGN PATENT DOCUMENTS

| CN | 109602270 | 4/2019 |
|----|-----------|--------|
| CN | 209558304 | 10/2019 |
| EP | 2363640 | 9/2011 |
| EP | 2369227 | 9/2011 |
| EP | 2650615 | 10/2013 |
| EP | 2896882 | 7/2015 |
| EP | 3112765 | 1/2017 |
| EP | 3553394 | 10/2019 |
| EP | 3575685 | 12/2019 |
| EP | 3610732 | 2/2020 |
| EP | 3647666 | 5/2020 |

* cited by examiner

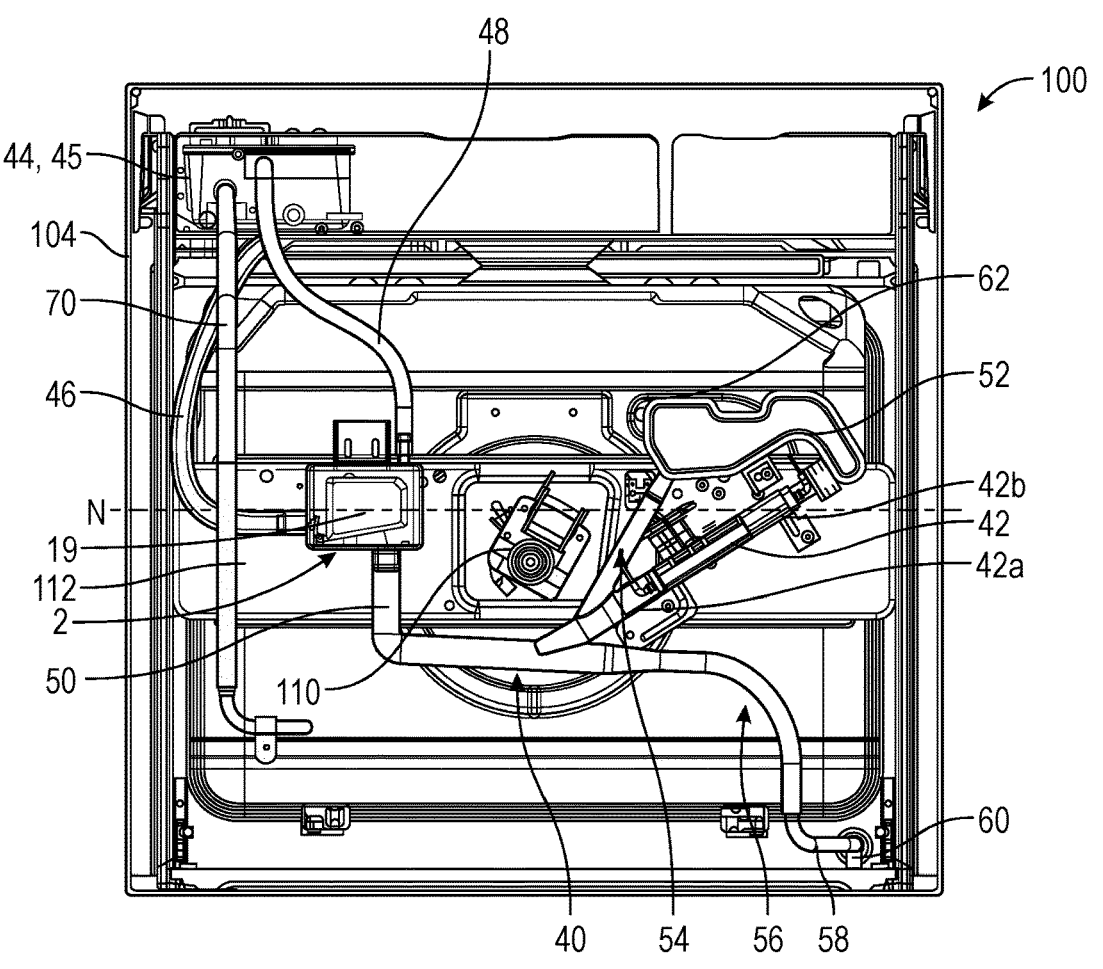
Fig. 1
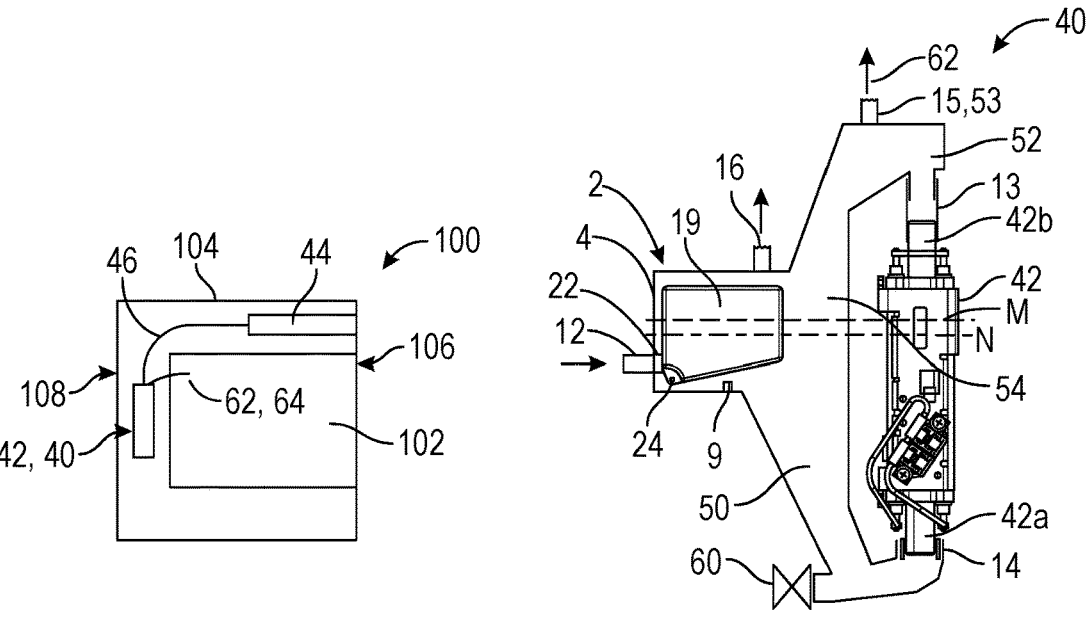
Fig. 2          Fig. 3

COOKING OVEN

The invention relates to a cooking oven.

BACKGROUND OF THE INVENTION

EP 3 647 666 A1 discloses a cooking apparatus including a cavity, a steam generator arranged at the rear of the cavity and configured to generate steam. A water supply device is arranged above the cavity and configured to supply water to the steam generator. A steam pipe is configured to connect the steam generator to the cavity to supply the steam generated by the steam generator to the cavity. A water supply control valve is arranged between the water supply device and the steam generator and configured to adjust a water level of the steam generator.

The cooking apparatus includes a water supply pipe configured to connect the water supply device to an upper end of the water supply control valve, a connection pipe configured to connect a lower end of the water supply control valve to a lower end of the steam generator, and a drain valve connected to the connection pipe and configured to discharge water in the water supply control valve, the steam generator, and the connection pipe. The water supply control valve includes a housing, an inlet portion arranged on an upper end of the housing and connected to the water supply pipe. A float is configured to move within the housing to open the inlet portion while a level of water in the housing is at a first level, and move within the housing to close the inlet portion while the level of water in the housing is at a second level above the first level. A buoyancy of the float is greater than gravity caused by a weight of the water supplied by the water supply device and flowing to the water supply control valve. In one embodiment the float may move in the vertical direction according to the water level of the water stored in the valve housing. The reliability of the functioning depends on the positing of the oven, in particular inclinations. In another embodiment, the floating device may include a float moving in the vertical direction by the buoyancy according to the water level of the valve housing. The float has a rotating member having one side thereof connected to the float, an opening and closing portion connected to the other side of the rotating member to open and close the inlet portion according to the vertical movement of the float, and a rotator arranged on an end portion of the rotating member to be rotatable according to the vertical movement of the float. In such a valve water drops in a non-continuous flow through the valve and a limestone aggregation in particular at the closing portion or inlet of the valve might lead to a degeneration of the reliability, in particular of the valve closing.

CN 209558304 U discloses a steam generator including a water tank, a float valve, an electric heating assembly, and a steam conveying structure, wherein the electric heating assembly is installed in the water tank to heat water in the water tank, and the steam conveying structure is connected to the water tank to convey. The water tank comprises a control structure, including a float, a link and a clamp. The link is rotatably mounted to the water tank, the float ball is fixed to one end of the link, and a pressure block, located inside a float valve is fixed to the other end of the link. The float valve is fixedly mounted in the second side plate of the water tank, and the float valve is provided with a water inlet and a side wall. The water inlet is provided at an upper end of the side wall.

EP 3 575 685 A1 discloses a steam generator and a cooking apparatus. The steam generator is arranged on the back side of the cooking apparatus. The steam generation tube may have a hollow tube having a shape in which a 'U' shape that is a horseshoe shape is inclined at an angle of about 90 degrees to about 120 degrees The steam generation tube is connected to an adapter, which is comprising a vertical collection tube.

EP 2 650 615 A1 discloses an oven comprising a baking chamber provided with a door for the introduction of the food products to be baked, a support frame, a heating device, which is arranged inside the baking chamber, so as to provide the heat needed to bake the food products, and a feeding device for feeding steam into the baking chamber itself. The feeding device comprises a water tank, which is fitted to the support frame, a tank filling duct, to which the user has access from a front wall of the oven, a discharge duct for discharging the water contained in the tank outside of the oven, a steam generator, which communicates with the tank, and a feeding circuit for feeding the steam produced by the steam generator into the baking chamber. In an embodiment, the tank is provided with a level sensor having a float, a separation chamber and a sleeve for coupling a filtering device having an outlet connected to a discharge duct and a port for connecting a steam generator. The steam generator may be connected by a further sleeve to the separation chamber.

EP 3 610 732 A1 discloses a conventional steam generating system for the cooking oven with steam cooking function. The steam generating system comprises a water tank, a water loading tube, an inlet valve, an air tube, a drain valve, a multi-connection tube, a steam generator and a steam nozzle. The steam generator includes a first thermal sensor and a second thermal sensor arranged within and/or at said steam generator. The drain valve is connected to the drain of an oven cavity. The water tank is connected to the inlet valve via the water loading tube. The outlets of the inlet valve and drain valve are connected to the steam generator via the multi-connection tube. The air tube is interconnected between the multi-connection tube and the oven cavity. The steam generator is connected to the oven cavity via the steam nozzle. The water tank is arranged above the inlet valve, so that the water is delivered by gravity from the water tank through the water loading tube to the inlet valve. EP 2896882 A1 discloses a steam generator shows flow type steam generators having a U-shape or L-shape.

EP 2 363 640 A1 as well as EP 2 369 227 A1 discloses an oven with a steam generating system. The oven is provided with a water reservoir on a top side and a steam generator on the back side. Within the connection tube between the water reservoir and the steam generator a pump or valve is located. The opening and closing of the valve may be controlled by means of a read switch located in a condensed water return tube of the steam generator. The steam generator is provided as inclined heating tube.

EP 3 112 765 A1 discloses a steam generator system for a cooking appliance having a cooking cavity. The system comprises a water supply tank and a cavity. The system is provided with a horizontal in line heating element. A lower check valve is provided between the water tank and the in line heating element.

EP 3 553 394 A1 discloses a steam generating system having a first tank and a second tank arranged above a boiler. A valve assembly is connected between the first and the second tank in one hose.

An object of the invention is to provide a cooking oven with a new steam generation system.

SUMMARY OF THE INVENTION

In an embodiment, a cooking oven comprises at least one cooking cavity and at least one steam generation system for introducing steam into the cooking cavity during a steam operating mode, in particular a steam cooking mode or a steam cleaning mode. The term "steam operating mode" comprises any operation of the cooking oven wherein steam is inserted or injected into the cavity and can also be called a steam operating function or steam operating cycle or steam operating feature.

The steam generation system comprises at least one steam generator (or: evaporator) for generating steam by evaporating the fluid and at least one fluid supply such as for instance a fluid tank or a fluid fill-in device e.g. a fluid drawer or the like. The term "fluid" is understood a pure liquid or also a multi-phase fluid such as a liquid containing gas bubbles or inclusions and/or solid particles or dissolved components. The fluid is preferably water with impurities, in particular calcium, and optionally additives. The fluid is for example tap water or purified tap water, which might be provided with additives.

The steam generation system further comprises at least one valve being interconnected or fluidly connected between the fluid supply and the steam generator in order to control the flow of fluid from the fluid supply to the steam generator during the steam operating mode.

The valve comprises at least one inlet for the fluid being in fluid connection with the fluid supply and the valve, in particular by at least one outlet of the valve, is in fluid connection with the steam generator by means of at least one connecting line.

The valve and the steam generator and the connecting line are in one embodiment arranged in such a way that the level of the fluid within the steam generator and within the valve is kept the same in the steam operating mode. Alternatively or in particular the valve and the steam generator fulfil or are subject to the principle of communicating vessels, according to which a fluid in fluidly communicating or connected vessels will assume the same fluid level under the influence of gravity and the same atmospheric pressure in all vessels. The valve and the steam generator and the connecting line preferably form such communicating vessels. This feature allows for a transport of the fluid from the valve to the steam generator solely by gravity without the need for pumps or other energy consuming transfer or feeding devices.

The valve is provided with at least one closing device for closing and opening the inlet of the valve at least partially during the steam operating mode in order to keep the fluid level within the valve (and therefore also the fluid level within the steam generator) at an operating level within an operating level range during the steam operating mode.

In principle, the fluid level in the valve increases by fluid being fed from the fluid supply into the valve and the steam generator through the inlet and decreases by fluid leaving the valve, in particular through the outlet, due to evaporation or consumption of fluid in the steam generator. By means of the valve and its closing device the fluid level in the valve and the steam generator is controlled as an operating level within a predetermined operating level range or control range. If, however, no more fluid is supplied by the fluid supply, a fluid level in the valve and the steam generator may drop below this operating level range or control range.

In an embodiment, the operating level or the operating level range during the steam operating mode is, in the direction of gravity, higher (or: above) or approximately at (or: at the same height) the inlet of the valve.

This means in particular that the inlet is arranged or immersed within the fluid or at the fluid level during the steam operating mode.

A first advantage of this feature (of the immersed inlet) may be that the flow path of fluid through the valve will be uninterrupted as fluid flowing in through the inlet will flow directly, in particular as a laminar flow, into the fluid reservoir or volume and not through intermediate air. This will avoid some-what unpredictable fluid flow and the formation of fluid drops.

A second advantage of this feature may be that the inlet will less likely be calcified and the surface of the inlet will not be covered with limescale or calcium deposit which would diminish or even close completely the cross-section of the inlet for the fluid flow and also create a rough surface at the inlet and deteriorate the sealing of the closing device at the inlet.

Higher in the gravitational direction (or: in the direction of gravity) means that the position is at a higher gravitational potential energy or further away from the centre of gravity of the Earth.

The operating level, in particular a maximum operating level, is in particular lower than a maximum filling level of the valve and in particular higher than a minimum filling level of the valve. This means in other words, that the valve is only partially filled at the operating level. A fluid level range can drop below a minimum filling level in case of brake down or water shortage in the fluid supply.

Normally, the operating level or operating level range is, in the direction of gravity, higher than at least a part of, preferably the whole outlet of the valve. Therefore, also the outlet of the valve is immersed in the fluid during the steam operating mode and the inlet and the outlet are connected by the fluid and all flow of the fluid will not be interrupted by an intermediate air space. This further supports a continuous stable laminar flow of fluid within the valve from the inlet to the outlet.

Preferably, the fluid supply, in the direction of gravity, is arranged higher than the operating level of the fluid, preferably higher than the valve and the steam generator. This allows for a transport of the fluid by gravity only without energy consumption for pumps or the like.

In an embodiment the operating level or the operating level range during the steam operating mode is, in the direction of gravity, higher than at least part of the closing device of the valve or the complete closing device and/or the closing device is continuously partially or completely immersed into the fluid during the steam operating mode. In particular, the operating level or the operating level range during the steam operating mode is higher than a closing portion of the closing device and/or the closing portion is continuously immersed into the fluid during the steam operating mode. An advantage of this feature is that the surface of the closing device will less likely be calcified as well and the sealing properties of the closing device will not deteriorate as quickly.

In a preferred embodiment the closing device of the valve is operated by a buoyancy force exerted on the closing device by the fluid and/or is arranged or formed at a floater floating in the fluid within the valve. In such an embodiment no active energy consuming electric or electronic and/or mechanical sensor and control components are needed for the control of the fluid flow through the valve as the energy for the closing device is taken from the fluid flow itself. The valve in this embodiment is a purely mechanical valve with the capability to self-regulate the flow and the level of the fluid. The buoyancy closing device and the corresponding valve follows the variation of the fluid level instantaneously. This mechanical self-regulating control of the liquid level to an operating level within the operating level is precise and very quick in its response characteristics.

In particular by the construction and arrangement of the closing device with respect to the inlet, various dependencies of the cross-section of the inlet opened or closed by the closing device on the fluid level within the operating level range can be set or achieved. Preferably the closing device closes the inlet completely when a maximum operating level of the operating level range is reached in order to safely avoid further filling of the valve above the maximum operating level in case the steam generator is not consuming any fluid. With regard to the opening of the inlet by the closing device various variants can be chosen. Preferably the closing device opens the inlet at least partially when an operating level within the operating level range having a predetermined distance from the maximum operating level is reached. Furthermore, the inlet is preferably opened completely by the closing device when a low operating level or, at the latest, when a minimum operating level is reached within the operating level range.

The closing device preferably comprises an elastic material, in particular a silicone sealing or rubber sealing and/or is inserted into the inlet when closing the inlet. The closing device, in particular a closing portion of the closing device has preferentially a flat sealing surface and/or might be provided with a protrusion. In particular a flat sealing surface of the closing portion seals against a sealing surface of the inlet. The sealing surface of the inlet might be part of the side wall of the valve and/or faces the inside of the valve housing.

In a further embodiment the steam generation system comprises at least one steam injector arranged at the cooking cavity for injection of steam generated by the steam generator into the cavity, wherein the steam injector is arranged higher, in the direction of gravity, than the operating level or operating level range, in particular higher than the valve and/or the steam generator: In particular, also the fluid supply is arranged higher, in the direction of gravity, than the steam injector.

In an embodiment the steam generation system comprises at least one precipitator or droplet separator, separating steam from droplets, arranged between the steam generator and the steam injector, preferably arranged higher, in direction of gravity, than the operating level or operating level range, in particular than the valve and/or the steam generator.

Preferably, the steam generation system further comprises a return line for fluid condensed in the precipitator, wherein the return line preferably connects a precipitator fluid outlet with the connecting line between the outlet of the valve and the steam generator and/or with the valve.

In an embodiment the steam generation system is at least partially arranged at the rear and outside of the cooking cavity.

In an embodiment the valve and the steam generator are arranged at opposite sides of a blower drive arranged outside of the cavity.

The steam generator is, in an advantageous embodiment, of generally or substantially tubular shape.

Preferably the steam generator extends in a direction inclined at an angle of between 250 and 90° to the horizontal direction, which is orthogonal to the direction of gravity, 90° corresponding to a vertical orientation in the direction of gravity.

In an embodiment precipitator is arranged directly above the steam generator.

In an embodiment the return line and the steam generator and preferably also a part of the connecting line are arranged in V-shape or, alternatively, along straight lines including an acute angle, in particular between 0° and 30°.

In an embodiment the valve and the steam generator and/or the return line are in fluid communication to a drain system, the drain system in particular comprising a drain valve.

In an embodiment some parts of the steam generation system may be integrated or made in one single pieces in particular by injection moulding.

In a preferred embodiment the precipitator, preferably with a steam outlet, the return line and at least a part of the housing of the valve are formed integrally or in a single piece.

In another embodiment at least a part of the housing of the valve and at least a part of the connecting line are formed integrally or in a single piece.

In yet another embodiment the precipitator, preferably with a steam outlet, the return line and the housing of the valve and at least a part of the connecting line are formed integrally or in a single piece.

Such an integrated design might be provided for reducing the overall size of the steam generation system and/or for a simplified mounting of the steam generation system with the oven, due to the limited number of individual parts.

Various preferred embodiments of the valve of the steam generation system are suggested as well. Such embodiments of the valve are claimed as a part of the cooking oven, but could also be claimed as such for use in a steam generation system of a cooking oven. Furthermore the valve could be claimed as individual unit. The valve could be combined with for example with a tank or another device, a filling level of which should be controlled.

In an embodiment, the valve of or for the steam generation system of the cooking oven comprises a housing for the fluid with the inlet and the outlet arranged at or being formed at or in a housing wall of the housing.

In an embodiment the closing device comprises a floater being pivotably arranged inside the housing.

The pivoting position of the floater depends on the pivot momentum resulting from buoyancy acting on the floater when the floater is at least partially arranged inside said fluid. Thus, the floater pivots to a predetermined position depending on the fluid level by the opposing forces of gravity and buoyancy.

The closing device further comprises the at least one closing portion for closing and opening the inlet of the valve at least partially during the steam operating mode in order to keep the fluid level within the valve at an operating level within an operating level range during the steam operating mode. In particular, the closing portion is attached to the floater.

The housing wall comprises a bottom wall and a side wall.

The inlet of the valve housing is preferably arranged at the side wall of the housing of the valve.

The operating level or the operating level range during the steam operating mode is, in the direction of gravity, higher than the inlet or at least higher than a lower end of the valve. The fluid level inside the housing may drop below the operating level range, when no more fluid is provided by the fluid supply, in particular the valve.

The inlet and the outlet of the housing are preferably provided with a sleeve or flange.

In a preferred embodiment, the floater is pivotably attached to the bottom wall or side wall of the housing, in particular by a hinge, wherein the pivoting axis is preferably close to the bottom wall. One part of the hinge may be connected with the bottom wall and/or the side wall and the other part of the hinge may be connected to the floater.

The hinge preferably comprises an axis mount and pivoting pins. The axis mount may be integrally formed at the bottom wall and/or side wall of the housing and/or extending from the bottom wall of the housing and the pivoting pins may extend from the floater or floater body on opposing sides or in opposite direc-tions. The axis mount may comprise a first axis mount part extending from a bottom wall and a second axis mount part extending from a side wall. If the axis mount is formed partially or completely at the side wall or extends from the side wall, it is preferably located on the side wall contiguously to the bottom wall. The pivoting pins preferably extend along the pivoting axis. The pivoting pins may be preferably formed integrally with the floater or floater body. An integral design of the pivoting pins with the floater body and the axis mount with the bottom wall reduced the number of necessary parts and thus facilitates an assembly. Alternatively pivoting pins might be formed by and axis attached to the floater or fed through a through-hole in the floater.

In an embodiment the floater comprises a floater body, wherein the floater body has a bottom face and a side face. The floater body needs to have a buoyancy in the fluid, in particular water. This may be achieved by a hollow floater body filled for example by air or another light gas, or by a floater body having a lower density than the fluid.

Preferably a pivoting axis of the floater is located close to the bottom face and the side face of the floater body. Addition-ally or alternatively the pivoting axis may intersect the floater body.

In a further embodiment an acute angle α is enclosed between the bottom face and the side face of the floater body. The side face is in particular the nearest face towards the inlet of the valve housing. In particular a pivoting angle φ around a pivoting axis and the acute angle α are in an identical plane. For example, bottom face and side face may contact each other by forming a corner in particular straight corner. If the floater turns over this corner, the pivoting angle φ and the acute angle α are in an identical plan. The floater body may be shaped as a prism. Such a floater may have in particular a top and a bottom face facing each other and a side face and a further side face facing each other. The opposing side may be arranged vertically to top face, bottom and the side faces. An angle β may be enclosed between the bottom face and the further side face of the floater body, an angle γ between the further side face and the top face and an angle δ between the top face and the side face. In particular floater body may be shaped as a trapezoidal prism. The prism may be symmetric or asymmetric.

The closing portion of the floater may be arranged or formed at the side face of the floater body. In particular the closing portion may extend from the side face in particular from a plain side face. Alternatively the closing portion may extend from a protruding side face portion protruding from the side face. In a further alternative the closing portion may be arranged and extend from an arm extending along the side face. Such an arm may extend from the floater body at or near the hinge respectively the acute angle α. The arm may have and L-shape or J-shape. The arm may be attached only by one end or by the end and an additional stiffening means, for example web or bracket.

In an embodiment, the closing device, in particular clos-ing portion may comprise a ring shaped sealing region having a flat surface for sealing against an surface region around the inlet facing towards an inside of the housing.

Inside the ringshape portion a protrusion might be located for being inserted into the inlet.

The housing may comprise a top wall, the side wall extending between the top wall and the bottom wall. In particular the housing may have a cuboide shape. An air vent may be located in the top wall of the housing.

The housing may be manufactured from a bottom part, comprising the bottom wall and the outlet, and a top part, comprising the inlet. Top and bottom part of the housing may be formed as integral parts, in particular from a plastic material. In one embodiment the floater may be assembled with the bottom part, for example by means of a hinge and in a further step the bottom part and the top part are connected together to from the valve.

The floater or floater body is made from two, in particular moulded, floater shells, in particular welded together. Alter-natively the floater body may be former from a lower floater part and a floater lid. In a further alternative embodiment the floater body is formed integrally by blow molding. The floater is in particular made from a plastic material.

BRIEF DESCRIPTION OF THE DRAWINGS

The present invention will now be further described with reference to exemplary embodiments and the accompanying drawings.

FIG. 1 shows a first embodiment of an oven with a first embodiment of a steam generation system, FIG. 2 shows a side view of an oven, FIG. 3 shows a second embodiment of a steam generation system.

Corresponding parts and quantities are designated by the same reference signs in the FIGS. 1 to 12.

Figures 4, 5, 6:
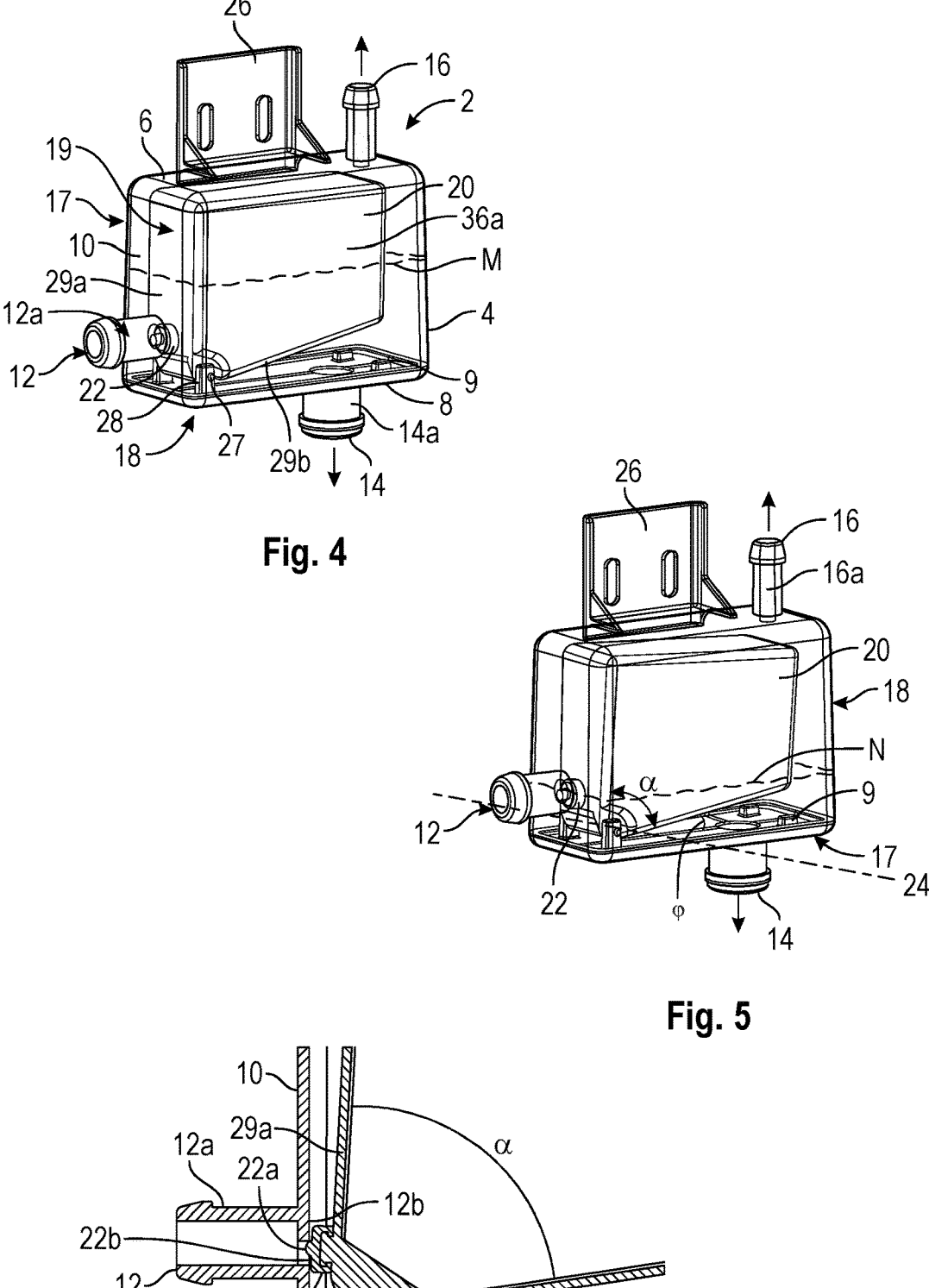
FIG. 4 shows a first embodiment of a valve in a closed state.
FIG. 5 shows the first embodiment of the valve in an open state.
FIG. 6 shows a cross section of the valve in the first embodiment.

The cooking oven 100 according to FIGS. 1 and 2 comprises a cooking cavity 102 arranged in a casing 104 as visible in the side view in FIG. 2 and a steam generation system 40. The steam generation system 40 is provided for introducing steam into the oven cavity 102 by means or at a steam injector 64 in a steam operating mode, which might be for example a steam cooking mode or a steam cleaning mode.

The steam generation system 40 comprises a steam gen-erator 42 arranged behind or on the rear side 108 of the cooking cavity 102 and a fluid supply 44. The fluid supply 44 is in particular a drawer or tank 45 accessible from a front side 106 of the oven 100 and is preferably arranged above of the cooking cavity 102. The fluid supply 44, in particular the tank 45, is in the embodiment provided with an optional overfill tube 70 for discharging fluid, in particular water, into the oven cavity 102 in case the user overfills the fluid supply 44, in particular the tank 45. The steam generation system 40 further comprises a valve 2, which is fluidly interconnected between the fluid supply 44 and the steam generator 42. An inlet line 46 is in this embodiment connecting the tank 45 to the valve 2, but the valve 2 may also be arranged directly in a lower region of the tank 45 for instance.

Steam generated in or by the steam generator 42 is guided into the cooking cavity 102 to a steam injection position 62. Injection of the steam into the cooking cavity 102 is preferentially provided by the steam injector 64. The steam injector 64 is typically arranged above or? in the vicinity of a fan arranged on the back side of the oven. The fan is provided with a blower drive 110. The blower drive 110 can be fixed at a carrier plate 112 as shown or at a chassis or casing of the cooking oven 100. In the shown preferred embodiment, the valve 2 and the steam generator 42 are arranged at opposite sides of the blower drive 110.

The steam generator 42 and the valve 2 are in fluid communication with each other by means of a connecting line 50. In this embodiment, the connection line 50 is interconnected preferably between an outlet 14 of the valve 2 and an inlet of the steam generator 42.

The steam generator 42 and valve 2 are in further fluid communication with a drain system 56 comprising a drain valve 60 and an optional drain line 58. However, the drain system 56 is optional. This drain system 56 is in particular arranged below the valve 2 and the steam generator 42 to allow a flow into the drain system by gravity, if desired by a user.

The steam generator 42 can be a tubular steam generator as shown in FIG. 1, having a lower end 42a serving as an inlet and an upper end 42b serving as an outlet. The upper end 42b of the steam generator 42 may be, as shown, connected to a precipitator 52, allowing to separate steam from droplets or condensed fluid. The droplets or condensed fluid are/is returned to an inlet of the steam generator 42, in particular by a return line 54. The return line 54 could be connected directly to the steam generator 42 or with a line or tube connected to the inlet of the steam generator 42, as shown in FIG. 1. The return line 54 and the steam generator 42 are arranged in a V-shape. The precipitator 52 is arranged higher than the steam generator 42. The precipitator 52 is provided with a steam outlet 53 near a steam injection position, which is in fluid, in particular in steam communication, with the steam injector 64. The steam generator 42 is arranged in an inclined position, however, the inclination angle shown is not limiting and may be adapted to the space arrangement or requirements of the cooking oven 100. The steam generator 42 has a maximum fluid level and a typical operating level range.

The valve 2 and the steam generator 2 and the connecting line 50 are arranged in such a way that the level of the fluid within the steam generator 42 and within the valve 2 is kept the same or at the same height during the steam operating mode in particular by the steam generator 42 and the valve 2 and the connecting line 50 being arranged or form communicating vessels.

The valve 2 is arranged and provided to keep the filling level or operating level of the steam generator 42 in an operating level range. and that the level of the steam generator does not drop under a minimum operating level during operation. No pump or further valve are arranged between the steam generator 42 and the valve 2 or necessary.

A nominal operating level of the steam generator 42 and of the valve 2 are indicated by the dashed line N. This nominal operating level is the operating level or inside the operating level range for the level control of the valve 2 and the steam generator 42. The valve 2 is provided with a closing device 19 for opening and closing the inlet 12 of the valve 2 at least partially during the steam operating mode in order to keep the fluid level within the valve 2 at the operating level or within the operating level range. The inlet of the valve is arranged below this nominal operating level marked with the dashed line N.

The outlet 14 of the valve is arranged at the bottom of the valve 2. The valve 2 shown with a housing 4 may be equipped with a floater 20, which will be discussed below. The valve 2 may further have an air outlet 16 with is connected with air vent line 48 to the fluid supply 44. This air vent line 48 might be connected as shown to the fluid supply 44. The valve 2 and the steam generator 42 may be attached to the carrier plate 112.

FIG. 3 shows an alternative embodiment of a steam generation system, which could be a substitute for the system in FIG. 1. This embodiment shows a more compact design. The steam generator 42 of FIG. 3 is arranged vertically.

The valve 2 is provided with an integrated housing 4. The housing 4 is provided with an inlet 12 at a side wall of the housing. In the upper region of the housing there might be an air vent 16 as depicted. The housing 4 is directly connected to the steam generator 42 by means of the outlet 14 of the housing 4 and a further inlet 13 of the housing. The housing 4 is partly C-shaped. The closing device 19 with the floater 20 and a closing portion 22 are located near the inlet 12, in order to close the inlet 12 with the closing portion 22 to keep the fluid at operating level or operating level range. One end of a pivoting range of the floater 2 is given by the protrusions 9, against which the floater 2 may abut.

The housing 4 of the valve 2 is provided integrally with a precipitator 52 and a connecting line 50 and a return line 54. The housing 4 has a drain outlet for connecting a drain valve 60.

The precipitator 52 is provided at a position above the further inlet 13. The precipitator 52 is provided with a further outlet 15 of the housing 4, forming a precipitator outlet 53, for guiding the steam to a steam injection position 62 and thus to a steam injector 64. The precipitator is connected with a portion of the housing forming the return line 54. The return line 54 is further connected with a connection line 50, which is an integral part of the housing 4. This part forming the connection line 50 leads the fluid to the outlet of the housing 14 connected to the lower end 42a of the steam generator. Thus, to the contrary of the embodiment shown in FIG. 1, the connection line 50 is arranged in fluid direction before the outlet 14 and not between the outlet 14 and the steam generator 42. The connection line 50 is further in fluid communication with a drain valve 60. The floater of the embodiment can be designed according to any of the embodiments of the valve described below with the FIGS. 4 to 12.

The depicted partial C-shape of the housing is not limiting. In particular a further tank region could be included in particular including a lower part of the return line 42 and an upper part of the connecting line 50. The outlet 14 could be arranged facing downward for being connected by a connection element with the steam generator and optionally a drain system. Such a tank region and or the precipitator might be provided with baffle walls.

The housing 4 as depicted in FIG. 3 might be formed in particular from two shells connected with each other. Inlet and outlet might be each provided on one of the shells.

FIG. 4 to 12 show different embodiment of the valve being a pure mechanical floater valve. The valves 2 are provided with a housing 4 enclosing a floater 20. The housing 4 is provided with an inlet 12 arranged at a side wall 10 of the housing 4. The housing 4 is further provided with a bottom wall 8, wherein the outlet 14 is arranged in the bottom wall 8. The inlet 12 is arranged near a lower edge or near the bottom wall 8 of the housing 4.

In a top wall 6 of the housing 4, there is arranged an air vent 16.

The housing 4 is provided with a bracket 26 at an upper end for attaching the housing 4 of the valve 2 at a casing or a carrier plate 112 of an oven. However, this attachment bracket is exemplary and other known possibilities for fixing the valve housing are possible.

In the shown embodiments the housing 4 has a top part 17 and a bottom part 18, wherein the bottom part 18 comprises the bottom wall 8 and the top part 17 comprises the side wall 10 and the top wall 6 as well as the inlet 12. However, a housing made for example from two shells, comprising half the inlet and half the outlet is as well possible. Each of the inlet 12, the outlet 14 and the optional air vent 16 might be provided with sleeves 12a, 14a, 16a or flanges for attaching tubes.

Inside the housing 4, there is arranged a closing device 19 being provided with a floater 20 and a closing portion 22.

FIGS. 4 and 5 show a first embodiment of the floater in the closing position in FIG. 4 and in an opening position in FIG. 5. The closing portion 22 is attached directly to a side face 29a of a floater body 21. The floater 20 is attached with a hinge at the bottom wall 8. The hinge comprises an axis mount 28 and pivoting pins 27. The pivoting pins 27 extends from opposing sides 36a,b of the floater body 21. The pivoting pins 27 define the pivoting axis 24. The axis mount 28 extends from the bottom wall 8. The axis mount can also be constituted partially by a protrusion extending from the bottom wall and partially by a protrusion extending from the side wall as shown with FIG. 12. The floater body 21 has the shape of a trapezoidal prism with an angle α which is located near the hinge and shown at the left corner in the figures. In the closing position of the closing device 19, in particular the closing portion 22, as shown in FIG. 4 the maximum fluid level M is above the inlet. The closing portion 22 is immersed into the fluid. In the open position the fluid level intersects the water inlet. The fluid flows continuously in the fluid. In the open position the fluid level may be also completely higher than the inlet instead of intersecting it. The pivoting angle φ is indicated in the drawing.

FIG. 6 shows a cross section of the embodiment of FIG. 4. The closing portion 22 is provided with a ring shaped outer sealing surface 22b and a protrusion 22a arranged in the middle. The protrusion 22a is inserted into the inlet, while sealing of the inlet is performed at the outer sealing surface 22b, being a smooth surface, against a sealing surface 12b of the inlet. The closing portion 22 is preferably made from an elastic material for example rubber.

Figures 7, 8, 9, 10, 11, 12:
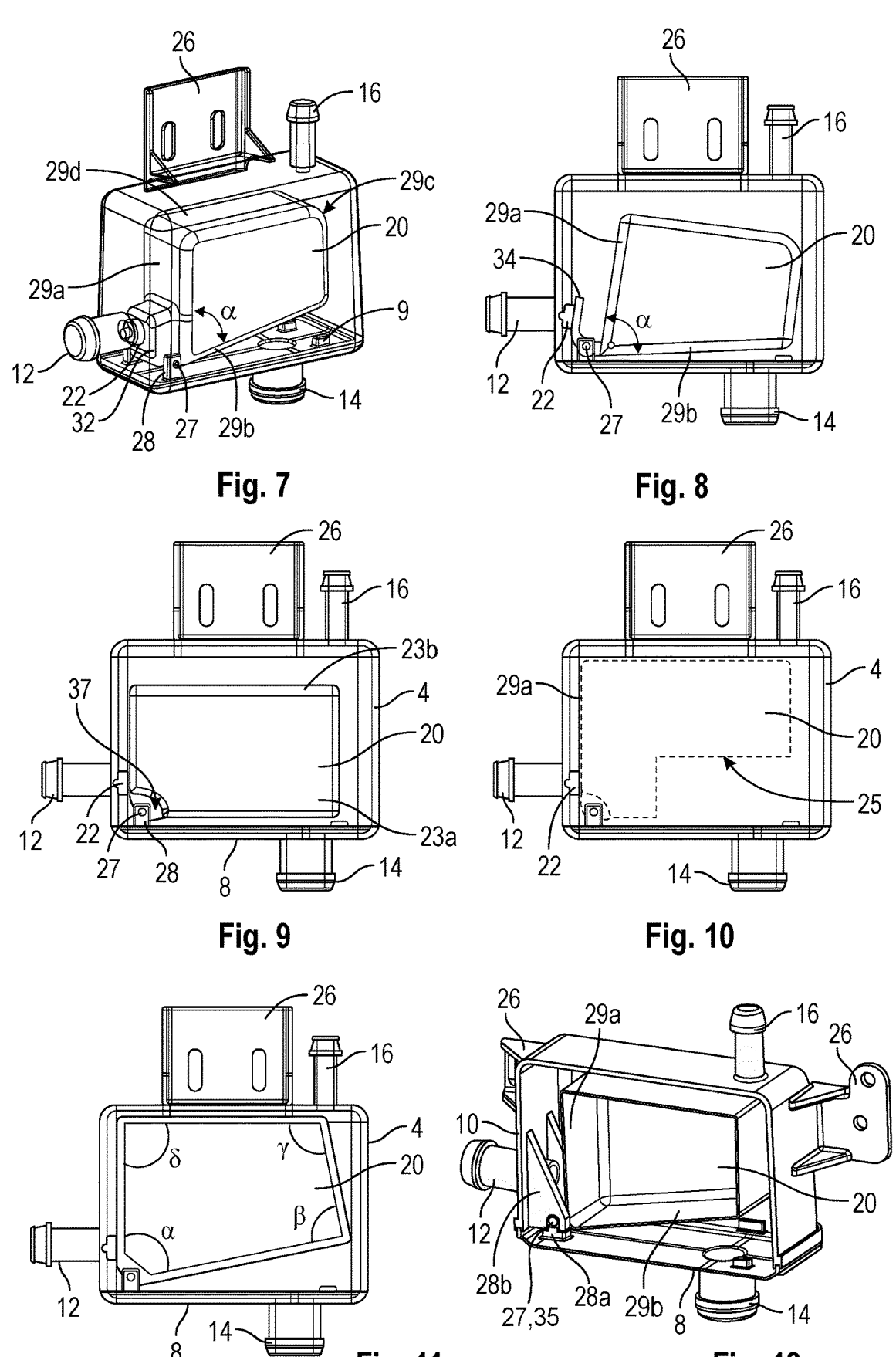
FIG. 7 shows a second embodiment of the valve.
FIG. 8 shows a third embodiment of the valve.
FIG. 9 shows a fourth embodiment of the valve.
FIG. 10 shows a fifth embodiment of the valve.
FIG. 11 shows a sixth embodiment of the valve.
FIG. 12 shows a seventh embodiment of the valve.

FIG. 7 shows a floater body having a protruding side face portion 32. The closing portion 22 extends form the protruding side face portion 32. The pivoting pins 27 are located at opposing sides in the protruding side face portion 32.

FIG. 8 show an embodiment of the floater comprising an arm 34 extending along the side face 29b. The closing portion 22 extends from the arm 34. The arm 34 is connected to the floater body near or at the hinge. There may be present also other connecting members between the side wall of the floater and the arm 34 like stiffening brackets in order to maintain structural integrity.

FIG. 9 shows an embodiment with a floater having in principle only right angles. In particular also the angle α is a right angle. The floater body 21 has a lower floater part 23a and a lid 23b. This embodiment shows a recess in side face 37, which could be or is as well present in the other embodiments depicted through FIGS. 4 to 11.

FIG. 11 shows a floater body 21 having a trapezoidal prims shape. The angles α, β, γ and δ are marked in this figure. Those angles are all different from each other, or at least one different from the others. The angles α and γ might be complementary angles, summing up to 180°. The angles β and δ might be both right angles FIG. 10 shows a floater body having a recess 25 in the bottom face and the further side face. This recess 25 is one option to avoid any blocking of the outlet. Another possibility for avoiding a blocking of the outlet are protrusions 9 as marked in the FIGS. 4 and 5. Those protrusions 9 limit the pivoting movement of the floater 2.

FIG. 12 shows a further embodiment of the valve 2, wherein the floater 20 is attached to a hinge, having an first axis mount part 28a that is attached to the bottom wall 8 and a second axis mount part 28b that is attached to the side wall 10. An axle 35 extends through the axis mount parts and the floater 20 in particular an arm 34 of the floater 20. This axle 35 might be provided alternatively as pivoting pins 27 extending from the floater. The first axis mount part 28a might be formed such the axle 35 or pivoting pins 27 bear on a convex top surface of the first axis mount part 28a and they are fixed by the second axis mount part 28b. The closing portion 22 might be attached directly to the side wall of the floater or as shown in FIG. 8 on an arm 34.

LIST OF REFERENCE NUMERALS

2 valve
4 housing
6 top wall
8 bottom wall
9 protrusion
10 side wall
12 inlet
12a sleeve
12b sealing surface
13 further inlet
14 outlet
14a sleeve
15 further outlet
16 air vent
16a sleeve
17 top part
18 bottom part
19 closing device
20 floater
21 floater body
21a,b floater shell
22 closing portion
22a protrusion of closing portion
22b sealing surface
23a lower floater part
23b floater lid
24 pivoting axis
25 recess
26 bracket
27 axis pin
28 axis mount
28a first axis mount part
28b second axis mount part
29a bottom face
29b side face
29c second side face
29d top face
30 recess
32 protruding side portion 34 arm
35 axle
36a,b opposing side faces
37 recess in side face
40 steam generation system
42 steam generator
42a steam generator inlet
42b steam generator outlet
44 fluid supply
45 tank
46 inlet line
48 air vent line
50 connecting line
52 precipitator
53 steam outlet
54 return line
56 drain system
58 drain line
60 drain valve
62 steam injection position
64 steam injector
70 line
100 cooking oven
102 cavity
104 casing
106 front side of oven
108 back side of oven
110 blow drive
112 carrier plate
α first angle
β second angle
γ third angle
δ fourth angle
φ pivot angle

The invention claimed is:

1. Cooking oven comprising:
a cooking cavity; and
a steam generation system for introducing steam into the cooking cavity during a steam operating mode, in particular a steam cooking mode or a steam cleaning mode, wherein the steam generation system comprises:
  a steam generator,
  a fluid supply that in use will supply a fluid comprising water,
  a valve interconnected between the fluid supply and the steam generator and configured to control a flow of fluid from the fluid supply to the steam generator during the steam operating mode; wherein the valve comprises an inlet in fluid connection with the fluid supply, and a closing device configured to close and open the inlet of the valve at least partially during the steam operating mode in order to keep a fluid level within the valve at an operating level within an operating level range during the steam operating mode, and
  a connecting line, wherein the valve is in fluid connection with the steam generator via the connecting line;
wherein the cooking oven further comprises one or more of the following features:
  the valve, the steam generator, and the connecting line are arranged in such a way that a level of the fluid within the steam generator and the level of the fluid within the valve are kept the same during the steam operating mode, and/or
  the valve, the steam generator, and the connecting line are arranged according to a principle of communicating vessels, and/or the operating level or the operating level range during the steam operating mode is, in a direction of gravity, higher than or at a same level as the inlet of the valve, further wherein:
  the valve comprises an outlet for the fluid, the outlet and the steam generator being interconnected by the connecting line, wherein the operating level or operating level range is, in the direction of gravity, higher than the outlet of the valve, and/or
  the fluid supply, in the direction of gravity, is arranged higher than the valve and/or the steam generator.

2. Cooking oven according to claim 1, wherein;
the operating level or a maximum operating level of the operating level range is lower than a maximum filling level of the valve, and/or
the operating level or a minimum operating level of the operating level range is higher than a minimum filling level of the valve and/or the valve is only partially filled at the operating level.

3. Cooking oven according to claim 1, wherein:
the closing device of the valve is operated by a force exerted on the closing device by the fluid and the closing device comprises a floater floating in the fluid within the valve, and
the closing device further comprises a closing portion coupled to or arranged at the floater for closing and opening the inlet of the valve at least partially during the steam operating mode in order to keep the fluid level within the operating level range during the steam operating mode.

4. Cooking oven according to claim 1, wherein:
the operating level or the operating level range during the steam operating mode is, in the direction of gravity, higher than the closing device of the valve, and/or
the closing device is partially or completely continuously immersed into the fluid during the steam operating mode, and/or
a closing portion of the closing device is continuously immersed into the fluid during the steam operating mode.

5. Cooking oven according to claim 1, wherein;
the closing device closes the inlet completely when a maximum operating level of the operating level range is reached, and/or
the closing device opens the inlet at least partially when an operating level within the operating level range having a predetermined distance from the maximum operating level is reached, and/or
the inlet is opened completely by the closing device when a low or minimum operating level within the operating level range is reached, and/or
the closing device comprises an elastic material and/or is inserted into the inlet when closing the inlet, and/or
the closing device comprises an elastic sealing surface for sealing against a sealing surface of the inlet.

6. Cooking oven according to claim 1, wherein:
the steam generation system comprises a steam injector arranged at the cooking cavity for injection of steam generated by the steam generator into the cavity,
the steam injector is arranged higher, in the direction of than the valve and/or the steam generator,
the fluid supply is arranged higher, in the direction of gravity, than the steam injector,
the steam generation system further comprises a precipitator arranged between the steam generator and the steam injector, the steam generation system further comprises a return line for fluid condensed in the precipitator, and the return line connects a precipitator fluid outlet with the connecting line and/or with the valve.

7. Cooking oven according to claim 1, wherein:

the steam generation system is at least partially arranged at a rear and outside of the cooking cavity, and/or the valve and the steam generator are arranged at opposite sides of a blower drive arranged out-side of the cavity, and/or the valve and the steam generator are in fluid communication with a drain valve.

8. Cooking oven according to claim 1, wherein:

the steam generator is of generally tubular shape, and/or the steam generator extends in a direction in-lined at an angle of between 25° and 90° to a horizontal direction, which is orthogonal to the direction of gravity, and/or the return line and the steam generator and also a part of the connecting line and are arranged in V-shape or, alternatively, along straight lines including an acute angle between 0° and 30°.

9. Cooking oven according to claim 6, wherein:

the precipitator, the return line and at least a part of a housing of the valve are formed integrally or in a single piece, and/or at least a part of the housing of the valve and at least a part of the connecting line are formed integrally or in a single piece, and/or the precipitator, the return line and the housing of the valve and at least a part of the connecting line are formed integrally or in a single piece.

10. Cooking oven according to claim 1, wherein:

the valve comprises a housing with an inner space for receiving the fluid, the inlet and the outlet are arranged at or formed at or in the housing or a housing wall of the housing, the inlet is arranged at a side wall of the housing, and the operating level or the operating level range during the steam operating mode is, in the direction of gravity, higher than the inlet of the valve.

11. Cooking oven according to claim 3, wherein:

the floater is pivotably arranged inside a housing of the valve, wherein a pivoting position of the floater depends on a pivot momentum resulting from buoyancy acting on the floater when the floater is at least partially arranged inside said fluid within the valve housing, the floater is pivotably attached to a bottom wall and/or a side wall of the housing, and a pivoting axis of said floater is close to the bottom wall.

12. Cooking oven according to claim 11, the floater being pivotally attached to the bottom wall by a hinge comprising an axis mount, wherein:

the axis mount is integrally formed at and/or extends from the bottom wall, and/or the axis mount is integrally formed at and/or extends from a portion of the side wall contiguous with the bottom wall of the housing, and/or the hinge comprises an axle attached to the floated or extending through the floater.

13. Cooking oven according to claim 3, wherein the floater comprises a hollow floater body having a bottom face and a side face, wherein;

a pivoting axis of the floater is located close to the bottom face and the side face of the floater body and/or intersects the floater body, and/or an acute angle is enclosed between the bottom face and the side face of the floater body, wherein a pivoting angle around a pivoting axis and the acute angle are in an identical plane, and/or the floater body is shaped as a prism, and/or the closing portion is arranged or formed at and extends from the side face, from a protruding side face portion protruding from the side face or from an arm extending from or along the side.

14. Cooking oven according to claim 3, wherein:

a housing of the valve comprises a top wall, a side wall and a bottom wall, the side wall extending between the top wall and the bottom wall, wherein an air vent is located in the top wall of the housing, and/or the floater comprises a floater body that is made from two molded floater shells welded together, or from a lower floater part and a floater lid, or wherein the floater body is formed integrally by blow molding.

15. A cooking oven comprising a cooking cavity and a steam generating system configured to deliver steam to the cooking cavity during a steam operating mode; the steam generating system comprising:

a fluid supply, a steam generator, a valve fluidly interconnected between the fluid supply and steam generator, the valve comprising:

a housing having an inlet configured to receive a supply of fluid from the fluid supply, and a valve outlet configured to deliver the fluid from said housing to the steam generator, the valve housing and an interior volume of the steam generator being in open fluid communication in order that in operation they will share a common fluid level as a result of a continuous fluid path therebetween, and a floater disposed within the housing, said floater being movable between a closing position and an opening position as a result of its buoyancy based on the fluid level in the housing, wherein in the closing position a sealing surface of a closing portion of the floater is sealingly urged against a sealing surface of the inlet thereby closing off the inlet to fluid flow, and in the opening position the sealing surface of the closing portion is at least partially separated from the sealing surface of the inlet thereby opening the inlet to fluid flow; and a connecting line, wherein the valve is in fluid connection with the steam generator via the connecting line, wherein the floater passively maintains the common fluid level of the valve housing and interior volume of the steam generator at an operating level within an operating level range during the steam operating mode, without a pump or application external energy beyond flow of the fluid through the valve housing, as a result the floater's buoyancy causing the floater to move:

toward the opening position as the common fluid level recedes as the fluid is converted to steam in the steam generator, and into the closing position as a result of the common fluid level rising from inflow of the fluid through the housing inlet while the inlet is open, further wherein:

the valve outlet and the steam generator are interconnected by the connecting line, wherein the operating level or operating level range is, in the direction of gravity, higher than the valve outlet, and/or the fluid supply, in the direction of gravity, is arranged higher than the valve and/or the steam generator.

16. The cooking oven according to claim 15, said fluid supply being located above said valve in order that the fluid is delivered from the fluid supply to the valve solely by gravity; said floater being pivotable between said closing and opening positions about a pivot axis defined by a hinge; both said inlet and said outlet being located below the operating level range of the fluid within the valve housing such that they are continuously immersed in the fluid in operation.

* * * * *